(12) United States Patent
Osterkamp et al.

(10) Patent No.: US 11,845,416 B2
(45) Date of Patent: Dec. 19, 2023

(54) VEHICLE CONTROL SYSTEM AND GEOGRAPHIC LOCATION-BASED OPERATION THEREOF

(71) Applicant: GM GLOBAL TECHNOLOGY OPERATIONS LLC, Detroit, MI (US)

(72) Inventors: Dale F. Osterkamp, Novi, MI (US); Jason R. Ekelmann, Royal Oak, MI (US); Paul R. Jewett, Holly, MI (US)

(73) Assignee: GM Global Technology Operations LLC, Detroit, MI (US)

(*) Notice: Subject to any disclaimer, the term of this patent is extended or adjusted under 35 U.S.C. 154(b) by 425 days.

(21) Appl. No.: 17/080,899

(22) Filed: Oct. 27, 2020

(65) Prior Publication Data
US 2022/0126811 A1    Apr. 28, 2022

(51) Int. Cl.
*B60W 20/13* (2016.01)
*B60W 10/06* (2006.01)
(Continued)

(52) U.S. Cl.
CPC .............. *B60W 20/13* (2016.01); *B60K 6/24* (2013.01); *B60K 6/26* (2013.01); *B60K 6/28* (2013.01); *B60K 6/46* (2013.01); *B60K 6/48* (2013.01); *B60W 10/06* (2013.01); *B60W 10/08* (2013.01); *B60W 10/10* (2013.01); *B60W 10/18* (2013.01); *B60W 10/22* (2013.01); *B60W 10/26* (2013.01); *B60W 10/30* (2013.01); *B60W 30/02* (2013.01); *B60W 50/06* (2013.01);
(Continued)

(58) Field of Classification Search
CPC ............ B60Y 2400/43; B60Y 2400/60; B60Y 2400/81; B60Y 2400/86; B60W 20/16; B60W 50/082; B60W 2555/60; B60W 2556/50; B60W 20/12; B60W 2554/4041; B60W 2556/40; Y02T 10/62; Y02T 10/70
See application file for complete search history.

(56) References Cited

U.S. PATENT DOCUMENTS 5,318,142 A * 6/1994 Bates ..................... B60K 6/28
                                                      903/917
2003/0009269 A1* 1/2003 Graf ....................... B60K 6/54
                                                      903/917
(Continued)

FOREIGN PATENT DOCUMENTS

CA         2429690 C  *  6/2010  ............. B60K 6/105

*Primary Examiner* — Donald J Wallace
(74) *Attorney, Agent, or Firm* — Quinn IP Law (57) ABSTRACT

A control system for a vehicle has a powertrain system that includes electric power propulsion system and a second propulsion system, a geographical position sensing system, a geographic map database, and a controller. The controller monitors a geographic location of the vehicle determine the geographic location of the vehicle in relation to a first predefined region and a first user-identified region. The powertrain system is controlled to generate propulsion power employing only the electric power propulsion system when the geographic location of the vehicle is within the first predefined region and when the geographic location of the vehicle is within the first user-identified region. The powertrain system is controlled to generate propulsion power employing the second propulsion system when the geographic location of the vehicle is outside the first predefined region and outside the first user-identified region.

20 Claims, 4 Drawing Sheets

(51) Int. Cl.

| | |
|---|---|
| *G01S 19/42* | (2010.01) |
| *G01C 21/00* | (2006.01) |
| *B60W 10/26* | (2006.01) |
| *G01C 21/34* | (2006.01) |
| *B60W 10/30* | (2006.01) |
| *B60W 10/22* | (2006.01) |
| *B60W 10/18* | (2012.01) |
| *B60W 30/02* | (2012.01) |
| *B60W 10/10* | (2012.01) |
| *B60W 50/06* | (2006.01) |
| *B60K 6/46* | (2007.10) |
| *B60K 6/48* | (2007.10) |
| *B60K 6/24* | (2007.10) |
| *B60K 6/26* | (2007.10) |
| *B60K 6/28* | (2007.10) |
| *B60W 10/08* | (2006.01) |

(52) U.S. Cl.
CPC ..... *G01C 21/3469* (2013.01); *G01C 21/3848* (2020.08); *G01S 19/42* (2013.01); *B60Y 2200/92* (2013.01); *B60Y 2400/112* (2013.01); *B60Y 2400/43* (2013.01); *B60Y 2400/60* (2013.01); *B60Y 2400/81* (2013.01); *B60Y 2400/86* (2013.01)

(56) References Cited

U.S. PATENT DOCUMENTS

| | | | | |
|---|---|---|---|---|
| 2006/0009890 | A1* | 1/2006 | Meister | B60R 16/037 701/1 |
| 2009/0326748 | A1* | 12/2009 | Frese | B60K 6/48 180/65.21 |
| 2011/0288737 | A1* | 11/2011 | Carr | B60W 20/11 701/99 |
| 2011/0313647 | A1* | 12/2011 | Koebler | G01C 21/3617 701/123 |
| 2012/0290149 | A1* | 11/2012 | Kristinsson | B60W 10/08 701/2 |
| 2016/0278087 | A1* | 9/2016 | Thanayankizil | H04W 4/021 |
| 2017/0080948 | A1* | 3/2017 | Lubbers | B60W 50/14 |
| 2019/0143996 | A1* | 5/2019 | Fawaz | B60W 50/00 701/36 |
| 2019/0293004 | A1* | 9/2019 | Gallagher | F02D 19/081 |
| 2021/0061254 | A1* | 3/2021 | Hashizume | B60W 20/40 |
| 2022/0032896 | A1* | 2/2022 | Ourabah | B60W 10/26 |
| 2022/0089145 | A1* | 3/2022 | Miyazato | B60W 20/13 |

\* cited by examiner

VEHICLE CONTROL SYSTEM AND GEOGRAPHIC LOCATION-BASED OPERATION THEREOF

INTRODUCTION

Some vehicles may be configured with powertrain systems that are capable of electric-only vehicle operation, wherein electric machines operate in an electric vehicle mode to generate propulsion power. Vehicles may be equipped with one or more systems for controlling vehicle dynamic operation, such as active suspension systems and active aerodynamic systems. Vehicles may be equipped with one or more Advanced Driver Assistance System (ADAS) systems.

There are political entities, e.g., cities or regions, that are considering regulating vehicle emissions by creating zero-emission zones or regions. Vehicles operating within a zero-emission zone would be compelled to generate zero emissions of presently regulated gases when operating within such regions. Such operation may be achieved by employing electric machines to generate propulsion power. Furthermore, vehicle operators may desire quiet operation of a vehicle at selected regions, for example so as not to introduce disruptive noise in a neighborhood. As such, there may be a need to manage vehicle powertrain operation to seamlessly transition to operate in an electric vehicle mode in certain predefined geographic regions. Furthermore, there may be a desire to seamlessly manage operation of other vehicle systems, such as active suspension systems, active aerodynamic systems, ADAS, etc., in certain user-defined geographic regions or predefined geographic regions.

SUMMARY

There may be a benefit to being able to automatically control an aspect of vehicle operation based upon its geographic location. This may include, by way of example, a vehicle having an electric/fuel hybrid powertrain system, wherein the vehicle is controlled to operate in an electric vehicle mode when it is within a predefined geographic location or a user-defined geographic location.

In one embodiment, a vehicle is described that includes a powertrain system having an electric power propulsion system and a second propulsion system, a geographical position sensing system, a geographic map database, and a controller. The geographic map database identifies a first predefined region corresponding to a political entity and a first user-identified region corresponding to a user-selectable geographic area. The controller is in communication with the geographic map database and the geographical position sensing system, and operatively connected to the powertrain system. The controller is operative to monitor, via the geographical position sensing system, a geographic location of the vehicle. The controller interrogates the geographic map database to determine the geographic location of the vehicle in relation to the first predefined region and the first user-identified region. The powertrain system is controlled to generate propulsion power via one of the electric power propulsion system or the second propulsion system based upon the geographic location of the vehicle in relation to the first predefined region and the first user-identified region. This includes the powertrain system being controlled to generate propulsion power employing only the electric power propulsion system when the geographic location of the vehicle is within the first predefined region and when the geographic location of the vehicle is within the first user-identified region. This includes the powertrain system being controlled to generate propulsion power employing the second propulsion system when the geographic location of the vehicle is outside the first predefined region and outside the first user-identified region.

An aspect of the disclosure includes the electric power propulsion system being an electric machine coupled to a drive wheel of the vehicle.

Another aspect of the disclosure includes the second propulsion system being an internal combustion engine coupled to the drive wheel of the vehicle.

Another aspect of the disclosure includes the internal combustion engine being coupled in series with the electric machine to the drive wheel of the vehicle.

Another aspect of the disclosure includes the internal combustion engine being coupled in parallel with the electric machine to the drive wheel of the vehicle.

Another aspect of the disclosure includes a DC power source electrically connected to the powertrain system, and a navigation system configured to determine a travel route and a destination for the vehicle. The controller is operative to execute charge management of the DC power source based upon the travel route and the destination for the vehicle in relation to the first predefined region. The charge management of the DC power source includes the controller being operative to control the powertrain system in a charge depletion mode when the geographic location of the vehicle is within either the first predefined region or the first user-identified region. The charge depletion mode includes generating propulsion power exclusively with the electric power propulsion system. The controller is operative to control the powertrain system in a charging mode when the geographic location of the vehicle is outside the first predefined region and outside the first user-identified region, wherein the charging mode includes generating propulsion power and electric power for charging the DC power source employing the electric power propulsion system and the second propulsion system.

Another aspect of the disclosure includes the controller being operative to control the powertrain system to generate propulsion power employing the electric power propulsion system and the second propulsion system when the geographic location of the vehicle is outside the first predefined region and outside the first user-identified region.

Another aspect of the disclosure includes a body actuator that is controllable in one of a plurality of vehicle dynamic control states. The controller is operatively connected to the body actuator. The geographic map database includes another user-identified region. The controller is operative to control the body actuator based upon the geographic location of the vehicle in relation to the other user-identified region.

Another aspect of the disclosure includes the body actuator being an active aerodynamic device, wherein the controller is operative to control the active aerodynamic device to a first position when the geographic location of the vehicle is within a second user-identified region, and wherein the controller is operative to control the active aerodynamic device to a second position when the geographic location of the vehicle is outside of the second user-identified region.

Another aspect of the disclosure includes the body actuator being an active suspension system, wherein the controller is operative to control the active suspension system to a first setting when the geographic location of the vehicle is within a third user-identified region, and wherein the controller is operative to control the active suspension system to a second setting when the geographic location of the vehicle is outside of the third user-identified region.

Another aspect of the disclosure includes the third user-identified region being an off-road region.

Another aspect of the disclosure includes an Advanced Driver Assistance System (ADAS) in communication with the controller, wherein the geographic map database includes a fourth user-identified region and wherein the controller is operative to disable the ADAS when the geographic location of the vehicle is within the fourth user-identified region.

Another aspect of the disclosure includes the body actuator being a controllable engine braking device, wherein the controller is operative to disable the controllable engine braking device when the geographic location of the vehicle is within the fifth region, and wherein the controller is operative to enable the controllable engine braking device when the geographic location of the vehicle is outside of the fifth region.

Another aspect of the disclosure includes the geographical position sensing system being one of a Global Positioning System (GPS) sensor, a Global Navigation Satellite System (GNSS) sensor, or an in-vehicle cell phone in communication with a plurality of cell tower antennas.

Another aspect of the disclosure includes as system for a vehicle that has a powertrain system having an electric power propulsion system and a second propulsion system, a body actuator that is controllable in one of a plurality of vehicle dynamic control states, and a geographical position sensing system. A geographic map database includes a first predefined region corresponding to a political entity, a first user-identified region corresponding to a user-selectable geographic area, and another user-identified region. A controller is in communication with the geographic map database and the geographical position sensing system, and operatively connected to the powertrain system and the body actuator. The controller is operative to monitor, via the geographical position sensing system, a geographic location of the vehicle, and determine the geographic location of the vehicle in relation to the first predefined region, the first user-identified region, and the other user-identified region. The powertrain system is controlled to generate propulsion power via one of the electric power propulsion system or the second propulsion system, wherein either the electric power propulsion system or the second propulsion system is selected based upon the geographic location of the vehicle in relation to the first predefined region and the first user-identified region. The body actuator is controlled in one of the plurality of vehicle dynamic control states, wherein the vehicle dynamic control state is determined based upon the geographic location of the vehicle in relation to the other user-identified region.

Another aspect of the disclosure includes a DC power source electrically connected to the powertrain system, and a navigation system configured to determine a travel route and a destination for the vehicle. The controller is operative to execute charge management of the DC power source based upon the travel route and the destination for the vehicle in relation to the first predefined region. The charge management of the DC power source includes the controller being operative to control the powertrain system to generate propulsion power via the electric power propulsion system when the geographic location of the vehicle is within either the first predefined region or the first user-identified region, and the controller being operative to control the powertrain system to generate propulsion power via the electric power propulsion system and the second propulsion system, and to generate electric power for charging the DC power source when the geographic location of the vehicle is outside the first predefined region and outside the first user-identified region.

Another aspect of the disclosure includes the body actuator being an active aerodynamic device, wherein the controller is operative to control the active aerodynamic device to a first position when the geographic location of the vehicle is within the other user-identified region, and wherein the controller is operative to control the active aerodynamic device to a second position when the geographic location of the vehicle is outside of the other user-identified region.

Another aspect of the disclosure includes the body actuator being an active suspension system, wherein the controller is operative to control the active suspension system to a first setting when the geographic location of the vehicle is within the other user-identified region, and wherein the controller is operative to control the active suspension system to a second setting when the geographic location of the vehicle is outside of the other user-identified region.

Another aspect of the disclosure includes a system for a vehicle having a powertrain system with a propulsion system that has an internal combustion engine and a geartrain, wherein the geartrain is operative in a first speed/load gear shifting calibration and a second speed/load shifting calibration. The system includes a geographical position sensing system; a geographic map database identifying a predefined region corresponding to a political entity, and a user-identified region corresponding to a user-selectable geographic area. A controller is in communication with the geographic map database and the geographical position sensing system, and operatively is connected to the powertrain system and the body actuator. The controller is operative to monitor, via the geographical position sensing system, a geographic location of the vehicle and determine the geographic location of the vehicle in relation to the predefined region, and the user-identified region. The powertrain system generates propulsion power employing the first speed/load shifting calibration when the geographic location of the vehicle is within either the predefined region or the user-identified region.

Another aspect of the disclosure includes the controller being operative to control the powertrain system to generate propulsion power employing the second speed/load shifting calibration when the geographic location of the vehicle is outside the predefined region and the user-identified region.

As such, operation of a propulsion system for a vehicle may be automatically controlled based upon navigation, route planning, and vehicle location in relation to predefined regions and user-identified regions.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure.

As used herein, the term "system" may refer to one of or a combination of actuators, sensors, controllers, circuits, software, firmware, and/or other components that are arranged to provide the described functionality.

Figure 1:
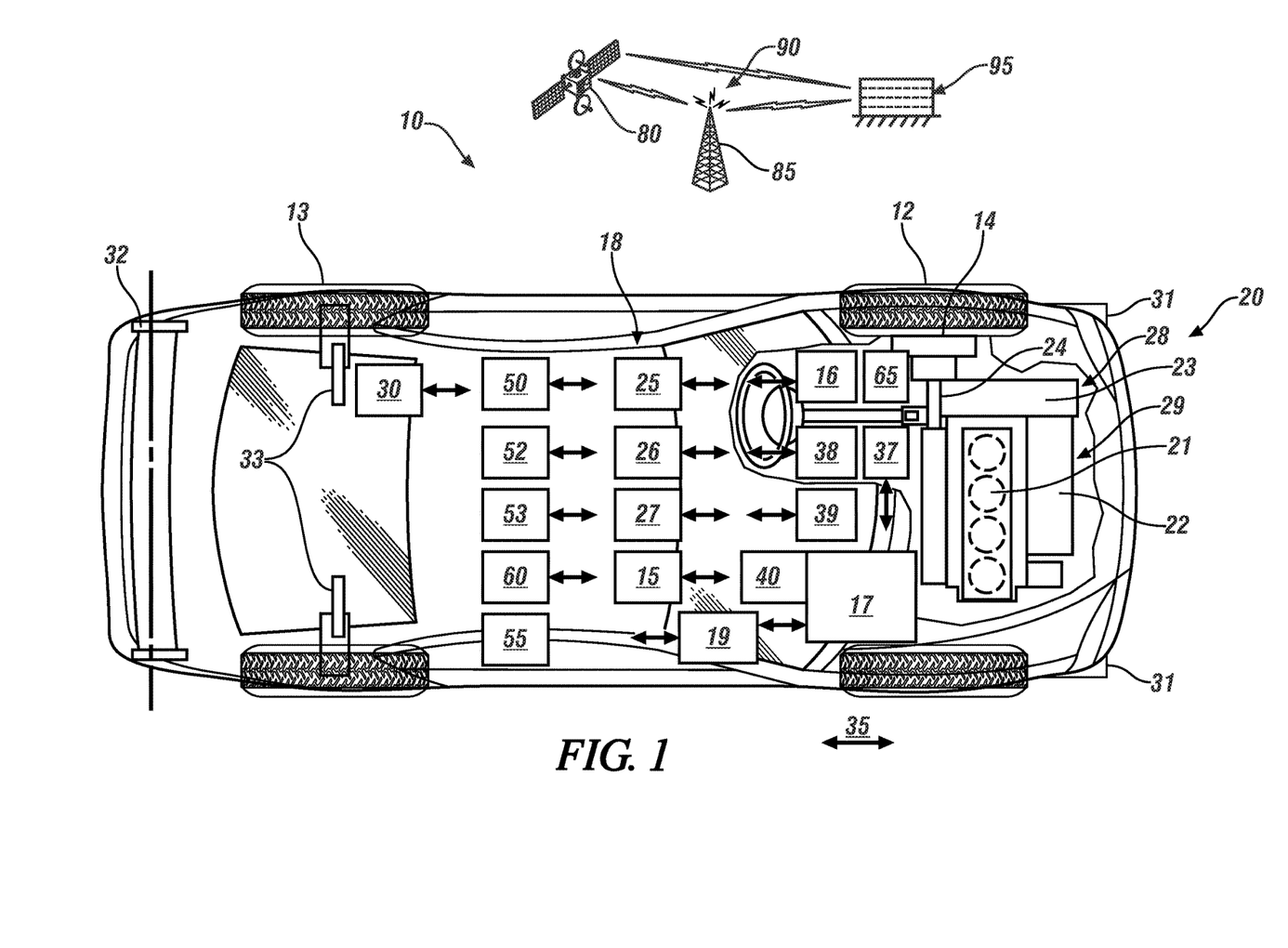
FIG. 1 schematically shows a top view of an embodiment of a vehicle that is configured with a control system, in accordance with the disclosure.

Referring now to the drawings, wherein the showings are for the purpose of illustrating certain exemplary embodiments and not for the purpose of limiting the same, FIG. 1 schematically shows an embodiment of a vehicle 10 that is configured with a control system 18 that is arranged to provide geographical position-specific operational control thereof. The control system 18 includes a task controller 15, a geographical position sensing system 50, and a geographic map database 40. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

In one embodiment and as described herein, the vehicle 10 includes a powertrain system 20 having an electric power propulsion system 28 acting as a first propulsion system, and a second propulsion system 29 for delivering propulsion power to one or multiple drive wheel(s) 12. Operation of the powertrain system 20 is controlled by a powertrain controller 25.

The electric power propulsion system 28 includes an electric machine 22, which is arranged to transfer propulsion power to the drive wheel(s) 12 through a geartrain 23 and a driveline 24. A DC power source 17 delivers electric power to the electric machine 22 through a high-voltage bus. The electric machine 22 may be a multi-phase permanent magnet electric machine in one embodiment that is capable of operating as either an electric motor or an electric power generator. This includes operating the electric machine 22 to generate propulsion torque and operating the electric machine 22 to react driveline torque in a regenerative braking state associated with a regenerative energy recovery strategy. Operation of the electric machine 22 is controlled by a motor controller 27, which is in communication with the powertrain controller 25.

In one embodiment, the electric power propulsion system 28 includes a single electric machine 22. Alternatively, the electric power propulsion system 28 includes multiple electric machines 22 in various arrangements to deliver propulsion power to one or multiple drive wheels and/or one or multiple axles.

In one embodiment, the DC power source 17 is a high-voltage multi-cell rechargeable battery. Alternatively, the DC power source 17 may be a capacitor, a fuel cell, or another device capable of storing and generating electric power. Routines for management of the DC power source 17, including charge management strategies and monitoring of state of charge (SOC), are executed by a battery state controller 19.

The second propulsion system 29 includes, in one embodiment and as shown, an internal combustion engine 21 that is arranged to transfer propulsion power to the drive wheel(s) 12 through the geartrain 23 and the driveline 24. In one embodiment, the internal combustion engine 21 is rotatably coupled to the geartrain 23 by an engine disconnect clutch (not shown). Operation of the internal combustion engine 21 is controlled by an engine controller 26, which is in communication with the powertrain controller 25.

The internal combustion engine 21 may be a multi-cylinder device spark-ignition or compression-ignition device that generates propulsion torque in response to a command from a controller that may be in communication with other on-vehicle controllers. The internal combustion engine 21 is controllable to operate in an engine ON state and an engine OFF state. When the internal combustion engine 21 is in the engine ON state, it generates torque for propulsion power or for generating electric power. When the internal combustion engine 21 is in the engine OFF state, it is not rotating or otherwise consuming fuel, and may be mechanically disconnected from the geartrain 23 by the engine disconnect clutch. In one embodiment, the internal combustion engine 21 includes an active fuel management (AFM) system, which includes a capability to operate in a cylinder deactivation mode, which operates to dynamically deactivate combustion in one or a plurality of the cylinders in order to conserve fuel under certain load conditions.

In one embodiment, the electric machine 22 and the internal combustion engine 21 are coupled in series to transfer propulsion to the drive wheel(s) 12 of the vehicle 10. In one embodiment, the electric machine 22 and the internal combustion engine 21 are coupled in parallel to transfer propulsion to the drive wheel(s) 12 of the vehicle 10. In one embodiment, the internal combustion engine 21 is coupled to another electric machine (not shown) to generate electric power, which may be transferred to either or both the electric machine 22 and the DC power source 17.

The geartrain 23 may include gear arrangements such as planetary gears, pinion gears, clutches, brakes, etc. for transferring and multiplying torque between the electric machine 22, the internal combustion engine 21, and the driveline 24. Embodiments of the geartrain 23 may include a fixed-gear automatic transmission, a continuously variable transmission, or another torque transmission device that is capable of transmitting torque at a fixed speed ratio or a variable speed ratio from either or both the internal combustion engine 21 and the electric machine 22 to the driveline 24. Operation of the geartrain 23, including gear ratio changing routines, is controlled by a powertrain controller 25. In one embodiment, the powertrain controller 25 includes a first speed/load gear shifting calibration and a second speed/load shifting calibration for controlling range shifting in the geartrain 23. By way of a non-limiting example, the first speed/load gear shifting calibration includes shifting that enables operation in a low speed ratio, high torque arrangement, such as for off-road operation, and the second speed/load shifting calibration shifting that enables operation in a high speed ratio, low torque arrangement, such as for highway operation. Other speed/load gear shifting calibrations may be used, in the alternative.

The driveline 24 may include driveshafts, differentials, half-shafts, transaxles, etc., for transferring and multiplying torque between the geartrain 23 and the driven wheel(s) 13.

The vehicle 10 has active aerodynamic control elements in one embodiment, including, by way of non-limiting examples, a controllable front air dam 31 and/or a controllable rear air dam 32. The controllable front air dam 31 and the controllable rear air dam 32 are connected to and controlled by a body controller 30.

The vehicle 10 has an active suspension system in one embodiment, including by way of non-limiting examples, controllable air shock absorbers 33. The controllable air shock absorbers 33 are connected to and controlled by the body controller 30, which may include control routines for controlling ride height, ride leveling, and user-selectable features related to ride smoothness, trailering, etc.

The vehicle 10 has a navigation system 52 configured to determine a travel route and a destination for the vehicle based upon user inputs to a Human-Machine Interface (HMI) system 16.

The HMI system 16 provides for human/machine interaction, for purposes of directing operation of an infotainment system, the vehicle navigation system 55, a remotely located service center and the like. The HMI system 16 monitors operator inputs and provides information to the operator including status of vehicle systems, service and maintenance information. The HMI system 16 communicates with and/or controls operation of a plurality of in-vehicle operator interface device(s). The HMI system 16 is depicted as a unitary device for ease of description, but may be configured as a plurality of controllers and associated sensing devices in an embodiment of the system described herein. The in-vehicle operator interface device(s) may include devices that are capable of transmitting a message urging operator action, such an electronic visual display module, e.g., a liquid crystal display (LCD) device, a heads-up display (HUD), an audio feedback device, etc.

The vehicle 10 employs the geographical position sensing system 50 to determine its geographical position. The geographical position sensing system 50 may include a Global Position System (GPS) sensor 51 and the navigation system 52. The geographical position sensing system 50 may instead employ a Global Navigation Satellite System (GNSS) sensor, or an in-vehicle cell phone associated with the telematics system 53. The telematics system 53 may be employed to determine a geographical position of the vehicle 10 by triangulation methods in conjunction with a plurality of proximal cell tower antennas.

The vehicle 10 may include an Advanced Driver Assistance System (ADAS) 38 that is in communication with the task controller 15 in one embodiment. The ADAS 38 is arranged to provide a level of autonomous vehicle operation, which may include an autonomous steering system, an autonomous acceleration system, (e.g., an adaptive cruise control system), an autonomous braking/collision avoidance system, and/or other systems, collectively referred to as ADAS actuators 37. The ADAS actuators 37 are configured to command and control autonomous vehicle operation separate from or in conjunction with operator requests.

The vehicle 10 may have a controllable engine braking device 39 that is controlled by the task controller 15, wherein vehicle braking can be achieved by using the internal combustion engine 21 and the geartrain 23 as a reverse air pump. Heavy duty trucks employ such braking mechanisms to reduce friction brake heating while descending a hill and in other situations. The task controller 15 is operative to enable and disable the controllable engine braking device 39.

The telematics system 53 includes a wireless telematics communication system that is capable of extra-vehicle communications for communicating with a communication network system having wireless and wired communication capabilities. The extra-vehicle communications includes short-range vehicle-to-vehicle (V2V) communication and/or vehicle-to-everything (V2x) communication, which may include communication with an infrastructure monitor, e.g., a traffic camera, and communication to a proximal pedestrian, etc. Alternatively or in addition, the telematics device 53 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics device 53, and the handheld device executes the extra-vehicle communication for communicating with an off-board controller 95 via a communication network 90, which may be in the form of a satellite 80, a cell tower antenna 85, and/or another mode of communication. Alternatively or in addition, the telematics device 53 executes the extra-vehicle communication directly by communicating with the off-board controller 95 via the communication network 90.

The geographic map database 40 is a datafile that is stored in an on-board memory storage device. The geographic map database 40 contains representations of roadways overlaid onto political entities (countries, states, cities, townships, etc.), and associated boundaries. The task controller 15 is able to interrogate the geographic map database 40 to determine a location of the vehicle 10 based upon information from the geographical position sensing system 50, wherein the location of the vehicle 10 includes the political entities (countries, states, cities, townships, etc.) associated therewith.

The terms controller, control module, module, control, control unit, processor and similar terms refer to various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event. Communication between controllers, and communication between controllers, actuators and/or sensors may be accomplished using a direct wired link, a networked communications bus link, a wireless link, a serial peripheral interface bus or another suitable communications link. Communication includes exchanging data signals in suitable form, for example, electrical signals via a conductive medium, electromagnetic signals via air, optical signals via optical waveguides, and the like. Data signals may include signals representing inputs from sensors, signals representing actuator commands, and communications signals between controllers.

A wheel braking system includes a device capable of applying braking torque to the drive wheels 12 and driven wheels 13, and an associated controller, which monitors signals from one or more sensors and generates commands to one or more actuators to control operation in a manner that is responsive to an operator request for braking.

Figure 2:
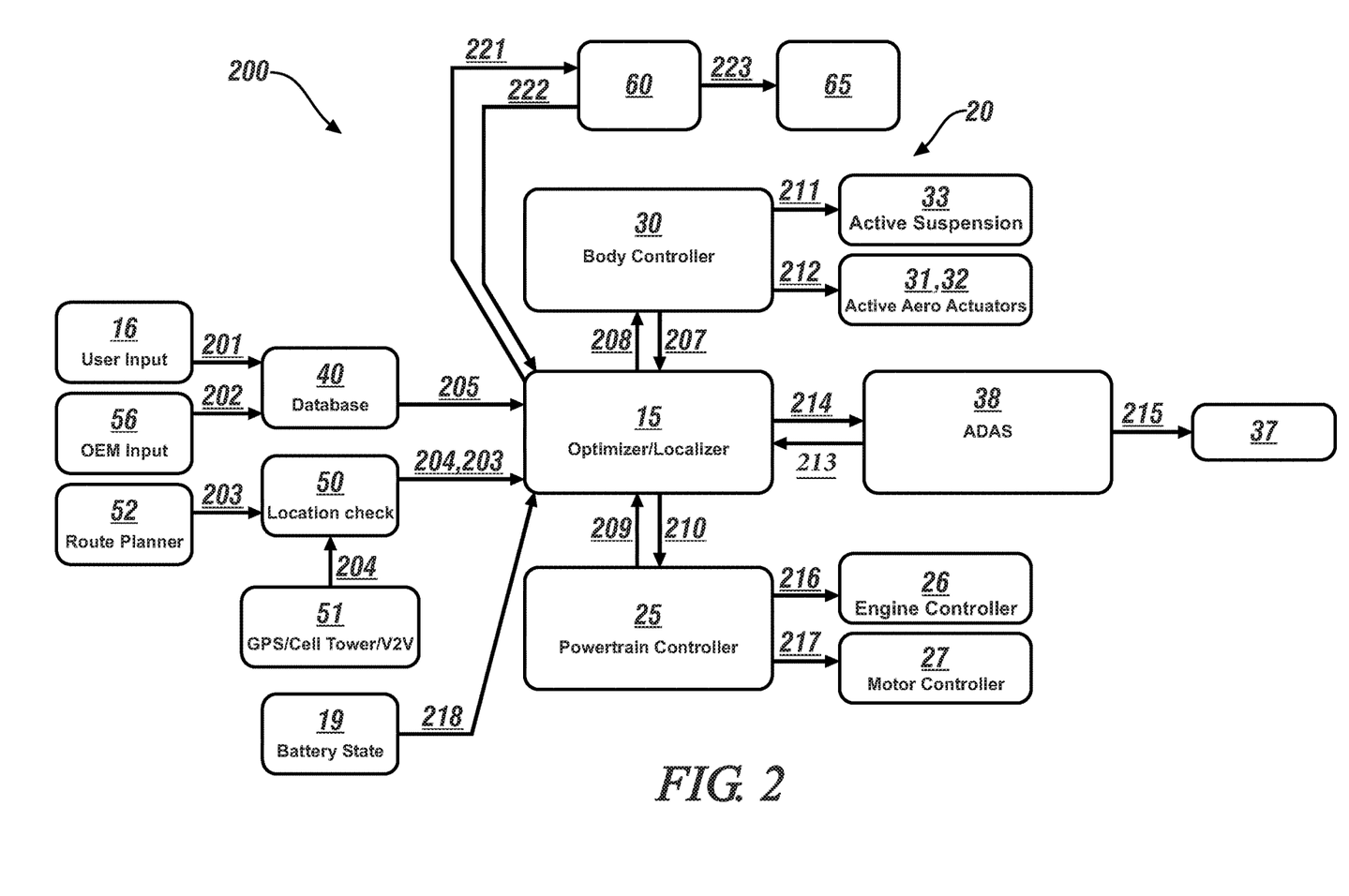
FIG. 2 schematically shows, in block diagram form, a control routine that may be executed by the control system described with reference to FIG. 1, in accordance with the disclosure.

FIG. 2 schematically shows, with continued reference to the vehicle 10 described with reference to FIG. 1, communications in the form of data and control commands that are transferred between the task controller 15, the geographic map database 40, the geographical position sensing system 50, the HMI 16, GPS 51, navigation 52, the powertrain controller 25, the body controller 30, the battery state controller 19, the ADAS 38, and other vehicle controllers that are collectively indicated by element 60.

The geographic map database 40 (Database) contains representations of political entities (countries, states, cities, townships, etc.), and associated boundaries.

Inputs to the database 40 include user-defined regions 201 (User Input) that may be selected by a vehicle user and provided through the HMI system 16, either directly or through a connected handheld device. The user-defined regions 201 may include geographic locations, political entities, private entities (e.g., a subdivision or neighborhood), local parks, state parks, national parks, privately-owned properties, etc.

Inputs to the database 40 include a plurality of predefined regions 202 that may be prepopulated by the vehicle manufacturer or a third-party entity (OEM Input) 56. The predefined regions 202 include political entities that are known to have instituted vehicle operating constraints. In one embodiment, the vehicle operating constraints may include a requirement for electric vehicle (EV) only operating mode within a political boundary, wherein a first predefined region 202-1 is defined by the political boundary. Alternatively, the vehicle operating constraints may include another vehicle operating constraint that is instituted by a political entity. By way of a non-limiting example, another vehicle operating constraint may be related to noise abatement. One example of a vehicle operating constraint related to noise abatement includes a constraint that prohibits vehicles such as medium duty or heavy duty commercial vehicles from employing engine braking within a town or city, wherein a second predefined region 202-2 is defined by the political boundary of the town or city.

Figure 4:
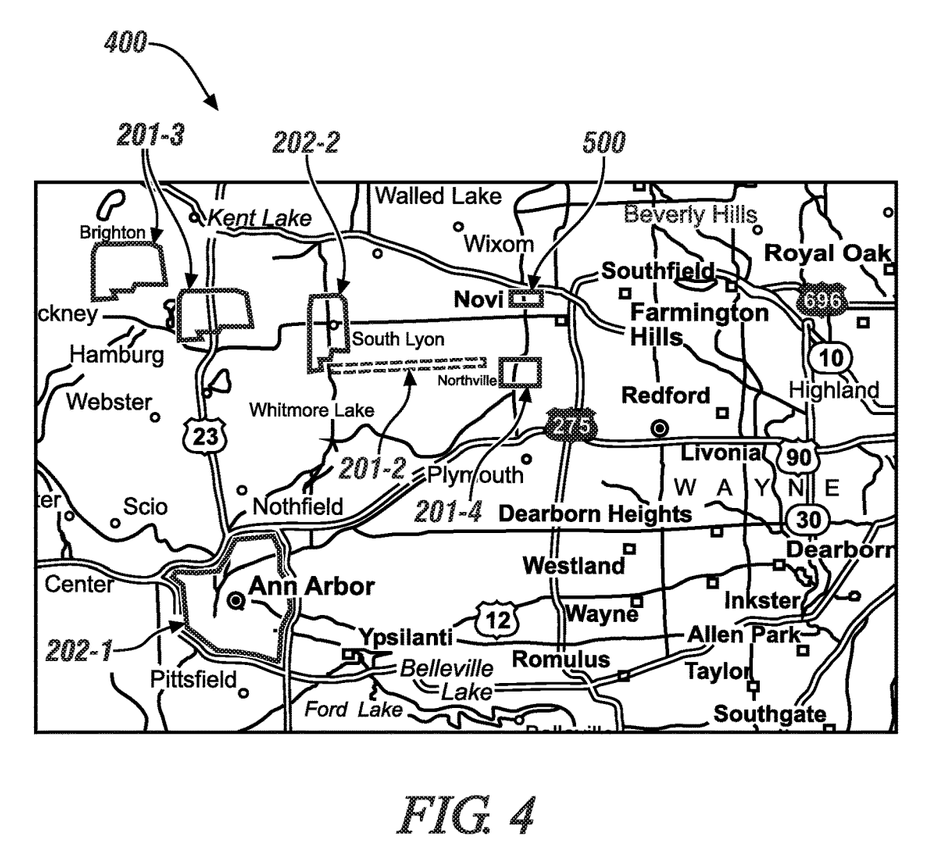
FIGS. 4 and 5 pictorially show portions of contents of an embodiment of a geographic map database, in accordance with the disclosure.
Figure 5:
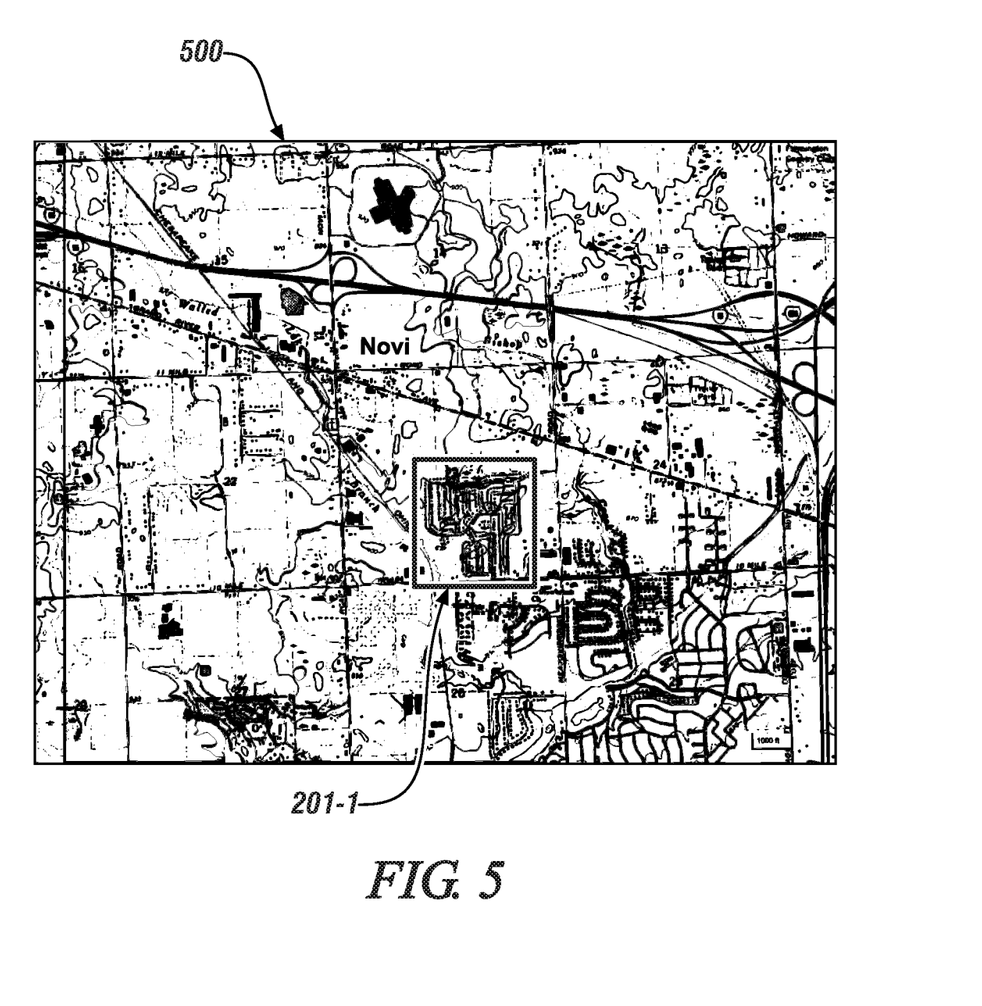

Based upon available information, the task controller 15 is able to monitor a geographic location of the vehicle 10 and determine the geographic location of the vehicle 10 in relation to one or a plurality of predefined region(s) 202, and in relation to one or a plurality of user-defined regions 201. FIGS. 4 and 5 pictorially depict examples of the plurality of predefined region(s) 202 and examples of the plurality of user-defined regions 201.

Referring now to FIG. 4, predefined regions 202 and user-defined regions 201 are pictorially shown and are overlaid on a geographic map portion 400, wherein the geographic map portion 400 includes identified political boundaries, travel routes, airports, recreation areas, etc. The predefined regions 202 include a first predefined region 202-1, which is a political entity that has been pre-identified as having implemented an ordinance requiring electric-only vehicle operation. The predefined regions 202 include a second predefined region 202-2, which is a political entity that has been pre-identified as having implemented an ordinance directing vehicle operation related to noise abatement.

The user-defined regions 201 include a first user-identified region 201-1, which is a user-identified area in which the user desires to have electric-only vehicle operation. An example of the first user-identified region 201-1 is a housing subdivision in which the vehicle user resides.

The user-defined regions 201 include a second user-identified region 201-2, which is a user-identified area in which the user desires to enable, disable, or otherwise control one or more of the active aerodynamic devices, e.g., the controllable front air dam 31 and/or the controllable rear air dam 32 that are described with reference to FIG. 1. An example of the second user-identified region 201-2 is an unpaved road surface.

The user-defined regions 201 include a third user-identified region 201-3, which is a user-identified area in which the user desires to enable, disable, or otherwise control one or more of the active suspension components, e.g., the controllable air shock absorbers 33 that are described with reference to FIG. 1. An example of the third user-identified region 201-3 is a public or private park area that permits off-road vehicle operation.

The user-defined regions 201 include a fourth user-identified region 201-4, which is a user-identified area in which the user desires to enable, disable, or otherwise control autonomous vehicle operation, e.g., the ADAS 38 that is described with reference to FIG. 1. An example of the fourth user-identified region 201-4 is a long-term construction zone, and the user may choose to disable autonomous vehicle operation, i.e., disable operation of the ADAS 38 therewithin.

Referring again to FIG. 2, the database 40 generates a state transition message 205, which is based upon the plurality of predefined regions 202 and the plurality of user-defined regions 201.

Inputs also include a route planner (Route Planner), which monitors operator inputs to the navigation system 52 through the HMI 16 or other devices (e.g., Android Auto, Apple CarPlay) to determine a desired destination 203.

Inputs include a geographical position 204 of the vehicle 10, which may be determined by the geographical position sensing system 50.

The geographical position sensing system 50 employs the geographical position 204 of the vehicle 10 and the desired destination 203 to execute a vehicle location check (Location Check), which identifies the present location of the vehicle 10 and planned destination(s), or absence thereof. The geographical position sensing system 50 generates a location/route message 206 that is communicated to the task controller 15, wherein the location/route message 206 includes the present location of the vehicle 10 and the planned destination(s), or absence thereof.

Another input that is communicated to the task controller 15 includes battery parameters 218 that are generated by the battery state controller 19, which monitors the DC power source 17. The battery parameters 218 include, e.g., a SOC of the DC power source 17. Other battery parameters 218 may include presence of faults associated with the DC power source 17 and the high-voltage bus.

The task controller 15 monitors inputs, including the state transition message 205, the location/route message 206, and the battery parameters 218 in order to determine control messages for the powertrain controller 25, the body controller 30, the ADAS 38, and the other vehicle controllers 60 in some embodiments. Overall, the task controller 15 receives the vehicle location/route message 206, the state transition message 205, and the battery parameters 218.

The task controller 15 evaluates the vehicle location/route message 206 and the state transition message 205 to determine the present geographic location of the vehicle 10 in relation to the plurality of user-defined regions 201 and the plurality of predefined regions 202 of the database 40.

The task controller 15 generates a first set of control commands 209 that are communicated to the powertrain control 25 to operate the powertrain system 20 to generate propulsion power via one of the electric power propulsion system 28, or the second propulsion system 29 that includes the internal combustion engine 21 based upon the present geographic location of the vehicle 10 in relation to the predefined regions 202.

The task controller 15 also generates the first set of control commands 209 that are communicated to the powertrain control 25 to operate the powertrain system 20 to generate propulsion power via one of the electric power propulsion system 28, or the second propulsion system 29 that includes the internal combustion engine 21 based upon the present geographic location of the vehicle 10 in relation to the user-defined regions 201. Examples of such operation may include enabling electric-only vehicle operation when the geographic location of the vehicle is within the first user-identified region 201-1 that is illustrated with reference to FIG. 4, wherein the first user-identified region 201-1 is a housing subdivision in which the vehicle user resides.

Referring again to FIG. 2, The control commands 209 include a first control state 216 for operating the internal combustion engine 21, and a second control state 217 for operating the electric machine 22.

When the present geographic location of the vehicle 10 is within one of the predefined regions 202, the first control state 216 for operating the internal combustion engine 21 includes a command for the internal combustion engine 21 to be in the engine OFF state, and the second control state 217 for operating the electric machine 22 includes a command for the electric machine 22 to generate propulsion power that is responsive to an operator torque request.

When the present geographic location of the vehicle 10 is outside of the predefined regions 202, the first control state 216 for operating the internal combustion engine 21 includes a command for the internal combustion engine 21 to be in the engine ON state, and the second control state 217 for operating the electric machine 22 includes a command for the electric machine 22 to generate propulsion power. The first control state 216 and the second control state 217 are combined so that one or both the internal combustion engine 21 and the electric machine 22 generate propulsion power that is responsive to the operator torque request. Furthermore, the first control state 216 and the second control state 217 may include commands to the internal combustion engine 21 and the electric machine 22 to operate to generate electric power that is transferred to and stored on the DC power source 17. This operation may be executed such that the SOC of the DC power source 17 is at a maximum SOC level or a desired SOC level when the geographic location of the vehicle 10 transitions into the predefined region 202 based upon route planning from the navigation system 52 that is associated with the desired destination 203.

Alternatively, or in addition, another of the predefined regions 202 may be related to another region, e.g., a noise abatement region, with controllable vehicle operation being associated with the other vehicle controllers 60. In this embodiment, the task controller 15 generates a second set of control commands 211 that are communicated to the other vehicle controllers 60 to operate another vehicle actuator 65 based upon the present geographic location of the vehicle 10 in relation to the predefined region 202. When the present geographic location of the vehicle 10 is within the predefined region 202, the control command 211 for operating the vehicle actuator 65 includes a command to deactivate the vehicle actuator 65. When the present geographic location of the vehicle 10 is outside of the predefined region 202, the control command 211 for operating the vehicle actuator 65 includes a command to activate the vehicle actuator 65.

The electric power propulsion system and the second propulsion system, respectively, are selected based upon the geographic location of the vehicle 10 in relation to the predefined region(s) 202 and user-defined regions 201.

When the vehicle location/route message 206 and the state transition message 205 indicates that the present geographic location of the vehicle 10 is within one of the predefined regions 202 of the database 40, the task controller 15 generates a first set of control commands 209 to operate the powertrain system 20 to generate propulsion power via one of the electric power propulsion system 28 or the second propulsion system 29, wherein control states 216, 217 for the electric power propulsion system 28 and the second propulsion system 29, respectively, are selected based upon the geographic location of the vehicle 10 in relation to the predefined region(s) 202 and user-defined regions 201.

Referring again to FIG. 2, the task controller 15 may also generate a second set of control commands 207 that are communicated to the body controller 30 to control one or more body actuators in one of the plurality of vehicle dynamic control states, wherein the vehicle dynamic control state is determined based upon the geographic location of the vehicle 10 in relation to a second user-identified region. By way of example, the body controller 30 may be commanded to control the active aerodynamic control elements including the controllable front air dam 31 and/or the controllable rear air dam 32 to a first position when the geographic location of the vehicle is within the second user-identified region 201-2 (shown with reference to FIG. 4), and commanded to control the active aerodynamic control elements to a second position when the geographic location of the vehicle is outside of the second user-identified region 201-2. An example of such operation may include disabling active aerodynamic control when the geographic location of the vehicle is one the second user-identified region 201-2, wherein the second user-identified region 201-2 is an unpaved road surface.

Alternatively, or in addition, another of the predefined regions 202 may be associated with enabling, disabling, or otherwise controlling one or more of the active aerodynamic devices via the body controller 30.

Referring again to FIG. 2, the task controller 15 may also generate a third set of control commands 208 that are communicated to the body controller 30 to control one or more body actuators in one of the plurality of vehicle dynamic control states, wherein the vehicle dynamic control state is determined based upon the geographic location of the vehicle 10 in relation to a third user-identified region. By way of example, the body controller 30 may be commanded to control the active suspension components 34 to a first position when the geographic location of the vehicle is within the third user-identified region 201-3 (shown with reference to FIG. 4), and commanded to control the active suspension components to a second position when the geographic location of the vehicle is outside of the third user-identified region 201-3. Examples of such operation may include enabling suspension control in an off-road mode when the geographic location of the vehicle is within the third user-identified region 201-3, wherein the third user-identified region 201-3 is a public or private park area that permits off-road vehicle operation.

Alternatively, or in addition, another of the predefined regions 202 may be associated with enabling, disabling, or otherwise controlling one or more of the active suspension components via the body controller 30.

Referring again to FIG. 2, the task controller 15 may also generate a fourth set of activation commands 213 to the ADAS 38. The fourth set of activation commands 213 may be in the form of a request to permit activation of the ADAS 38, or a command to deactivate the ADAS 38, wherein the ADAS control state is determined based upon the geographic location of the vehicle 10 in relation to a fourth user-identified region 201-4 (shown with reference to FIG. 4). By way of example, the ADAS 38 may be commanded to disable actuators associated with autonomous vehicle operation when the geographic location of the vehicle is within the fourth user-identified region 201-4, and commanded to enable actuators associated with autonomous vehicle operation and control the ADAS 38 to permit autonomous vehicle operation when the geographic location of the vehicle is outside of the fourth user-identified region 201-4. Alternatively, or in addition, another of the predefined regions 202 may be associated with enabling or disabling control of the vehicle 10 using the ADAS 38. The ADAS 38 also checks for presence of fault codes and other diagnostic issues that may preclude operation of the ADAS 38, and generates a command 215 to engage the ADAS actuators 37 to permit operation in one of plurality of ADAS control states when the geographic location of the vehicle 10 is outside the fourth user-identified region 201-4.

The task controller 15 is operative to command execution of charge management strategies of the DC power source based upon the travel route and the destination for the vehicle in relation to the first predefined region 202-1 or the first user-identified region 201-1. The charge management of the DC power source 17 includes the powertrain controller 25 being operative to control the powertrain system 20 to generate propulsion power via the electric power propulsion system 28 when the geographic location of the vehicle 10 is within either the first predefined region 202-1 or the first user-identified region 201-1. The powertrain controller 25 is operative to control the powertrain system 20 to generate propulsion power via the electric power propulsion system 28 and the second propulsion system 29, and to generate electric power for charging the DC power source when the geographic location of the vehicle 10 is outside the first predefined region 202-1 and outside the first user-identified region 201-1.

Figure 3:
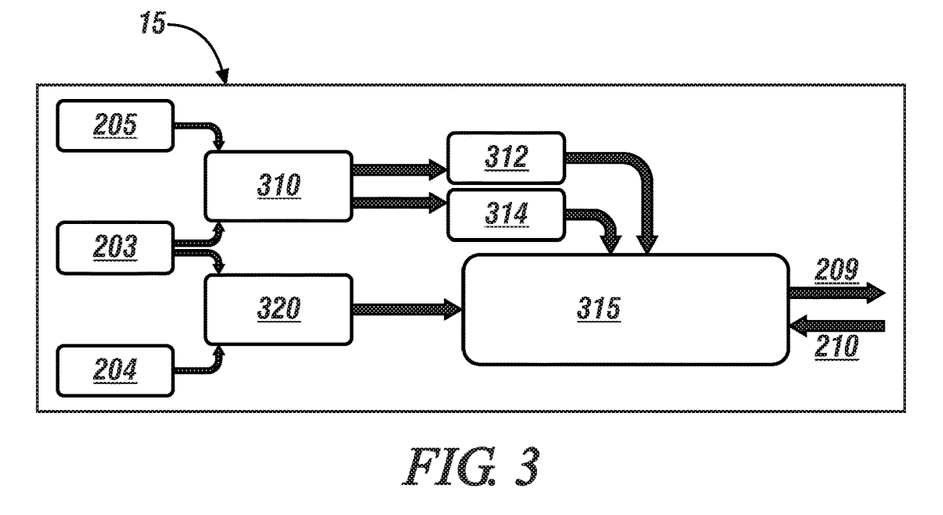
FIG. 3 schematically shows, in block diagram form, additional details related to the control routine of FIG. 2, in accordance with the disclosure.

FIG. 3 schematically shows additional details related to operation of the task controller 15, with continued reference to the vehicle 10 described in FIG. 1 and the control routine 200 described in FIG. 2. Inputs to the task controller 15 include the desired destination 203 (or absence thereof), the planned travel route 206 (or absence thereof), the present geographical position 204 of the vehicle 10, and the state transition message 205 from the database 40. The present geographical position 204 of the vehicle 10 is evaluated in context of the state transition message 205 from the database 40 to determine whether the vehicle 10 is located in one of the plurality of predefined regions 202-1 that is associated with EV operation (310). When the vehicle 10 is located in one of the plurality of predefined regions 202-1 that is associated with EV operation, an EV transition command is generated and sent to an optimizer 315 (312). When the vehicle 10 is located outside of the plurality of predefined regions 202-1 that is associated with EV operation, a maintain present state command is generated and sent to the optimizer 315 (314).

The present geographical position 204 of the vehicle 10 is also evaluated in context of the desired destination 203, the planned travel route 206, and the battery parameters 218 including the SOC of the DC power source 17 (320).

The optimizer 315 evaluates the present powertrain state, i.e., EV or second state, and evaluates the need to adjust powertrain operation based upon the battery parameters 218 including the SOC of the DC power source 17.

This includes commanding the engine state to an OFF state when the vehicle 10 is located in one of the plurality of predefined regions 202-1 that is associated with EV operation.

This includes commanding the powertrain system 20 to operate in a charging mode when the vehicle 10 is located outside of the predefined regions 202-1 that is associated with EV operation, and its destination or a portion of its travel route includes one or more of the predefined regions 202-1.

In this manner, the optimizer 315 executes charge management of the DC power source 17 based upon the travel route and the destination for the vehicle in relation to the first, predefined region 202-1. The charge management of the DC power source includes the optimizer 15 being operative to control the powertrain system 20 to generate propulsion power via the electric power propulsion system 28 when the geographic location of the vehicle 10 is within the first, predefined region 202-1. The optimizer 315 is operative to control the powertrain system 20 to generate propulsion power via the electric power propulsion system 28 and the second propulsion system 29 and to generate electric power for charging the DC power source 17 when the geographic location of the vehicle 10 is outside the first, predefined region 202-1.

The optimizer 315 monitors the present state 210 of the powertrain system 20, and generates the first set of control commands 209 that are communicated to the powertrain control 25 to operate the powertrain system 20 to generate propulsion power via the electric power propulsion system 28 and/or the second propulsion system 29 based upon the present geographic location of the vehicle 10 in relation to the predefined regions 202 and in relation to the user-defined regions 201.

FIG. 4 pictorially shows a first portion of contents of an embodiment of the geographic map database 40 that is described with reference to FIG. 1, FIG. 5 pictorially shows a second portion of contents of an embodiment of the geographic map database 40 that is described with reference to FIG. 1.

The identified first predefined regions and first user-identified regions are provided for purposes of illustration, and do not presently reflect actual regions wherein operation in EV-only modes is required.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A control system for a vehicle, comprising:
a powertrain system including an electric power propulsion system, and a second propulsion system;
a geographical position sensing system;
a geographic map database identifying a first predefined region corresponding to a political entity and a first user-identified region corresponding to a user-selectable geographic area; and
a controller, in communication with the geographic map database and the geographical position sensing system, the controller operative to:
monitor, via the geographical position sensing system, a geographic location of the vehicle,
interrogate the geographic map database to determine the geographic location of the vehicle in relation to the first predefined region and the first user-identified region,
control the powertrain system to generate propulsion power employing only the electric power propulsion system when the geographic location of the vehicle is within the first predefined region and when the geographic location of the vehicle is within the first user-identified region, and
control the powertrain system to generate the propulsion power employing the second propulsion system when the geographic location of the vehicle is outside the first predefined region and outside the first user-identified region.

2. The control system of claim 1, wherein the electric power propulsion system comprises an electric machine coupled to a drive wheel of the vehicle.

3. The control system of claim 2, wherein the second propulsion system comprises an internal combustion engine coupled to the drive wheel of the vehicle.

4. The control system of claim 3, wherein the internal combustion engine is coupled in series with the electric machine to the drive wheel of the vehicle.

5. The control system of claim 3, wherein the internal combustion engine is coupled in parallel with the electric machine to the drive wheel of the vehicle.

6. The control system of claim 1, further comprising a DC power source electrically connected to the powertrain system, and a navigation system configured to determine a travel route and a destination for the vehicle;
wherein the controller is operative to execute charge management of the DC power source based upon the travel route and the destination for the vehicle in relation to the first predefined region, the charge management of the DC power source including:
the controller being operative to control the powertrain system in a charge depletion mode when the geographic location of the vehicle is within either the first predefined region or the first user-identified region, wherein the charge depletion mode includes generating the propulsion power exclusively with the electric power propulsion system, and
the controller being operative to control the powertrain system in a charging mode when the geographic location of the vehicle is outside the first predefined region and outside the first user-identified region, wherein the charging mode includes generating the propulsion power and electric power for charging the DC power source employing the electric power propulsion system and the second propulsion system.

7. The control system of claim 1, further comprising the controller being operative to control the powertrain system to generate the propulsion power employing the electric power propulsion system and the second propulsion system when the geographic location of the vehicle is outside the first predefined region and outside the first user-identified region.

8. The control system of claim 1, further comprising:
a body actuator, controllable in one of a plurality of vehicle dynamic control states, wherein the controller is operatively connected to the body actuator;
wherein the geographic map database includes a second user-identified region; and
wherein the controller is operative to control the body actuator based upon the geographic location of the vehicle in relation to the second user-identified region.

9. The control system of claim 8, wherein the body actuator comprises an active aerodynamic device;

wherein the controller is operative to control the active aerodynamic device to a first position when the geographic location of the vehicle is within the second user-identified region; and wherein the controller is operative to control the active aerodynamic device to a second position when the geographic location of the vehicle is outside of the second user-identified region.

10. The control system of claim 8, wherein the body actuator comprises an active suspension system;

wherein the geographic map database includes a third user-identified region;

wherein the controller is operative to control the active suspension system to a first setting when the geographic location of the vehicle is within the third user-identified region; and wherein the controller is operative to control the active suspension system to a second setting when the geographic location of the vehicle is outside of the third user-identified region.

11. The control system of claim 10, wherein the third user-identified region comprises an off-road region.

12. The control system of claim 1, further comprising an Advanced Driver Assistance System (ADAS) in communication with the controller;

wherein the geographic map database includes a fourth user-identified region; and wherein the controller is operative to disable the ADAS when the geographic location of the vehicle is within the fourth user-identified region.

13. The control system of claim 1, further comprising:

a controllable engine braking device, wherein the controller is operatively connected to the engine braking device;

wherein the geographic map database includes a second predefined region; and wherein the controller is operative to disable the controllable engine braking device when the geographic location of the vehicle is within the second predefined region.

14. The control system of claim 1, wherein the geographical position sensing system comprises one of a Global Positioning System (GPS) sensor, a Global Navigation Satellite System (GNSS) sensor, or an in-vehicle cell phone in communication with a plurality of cell tower antennas.

15. A system for a vehicle, comprising:

a powertrain system, including an electric power propulsion system and a second propulsion system;

a body actuator, controllable in one of a plurality of vehicle dynamic control states;

a geographical position sensing system;

a geographic map database identifying a first predefined region corresponding to a political entity, a first user-identified region corresponding to a user-selectable geographic area, and another user-identified region; and a controller, in communication with the geographic map database and the geographical position sensing system, and operatively connected to the powertrain system and the body actuator, the controller operative to:

monitor, via the geographical position sensing system, a geographic location of the vehicle, determine the geographic location of the vehicle in relation to the first predefined region, the first user-identified region, and the other user-identified region, control the powertrain system to generate propulsion power via one of the electric power propulsion system or the second propulsion system, wherein either the electric power propulsion system or the second propulsion system is selected based upon the geographic location of the vehicle in relation to the first predefined region and the first user-identified region, and control the body actuator in one of the plurality of vehicle dynamic control states, wherein the vehicle dynamic control state is determined based upon the geographic location of the vehicle in relation to the other user-identified region.

16. The system of claim 15, further comprising a DC power source electrically connected to the powertrain system, and a navigation system configured to determine a travel route and a destination for the vehicle;

wherein the controller is operative to execute charge management of the DC power source based upon the travel route and the destination for the vehicle in relation to the first predefined region, the charge management of the DC power source including:

the controller being operative to control the powertrain system to generate the propulsion power via the electric power propulsion system when the geographic location of the vehicle is within either the first predefined region or the first user-identified region, and the controller being operative to control the powertrain system to generate the propulsion power via the electric power propulsion system and the second propulsion system, and to generate electric power for charging the DC power source when the geographic location of the vehicle is outside the first predefined region and outside the first user-identified region.

17. The system of claim 16, wherein the body actuator comprises an active aerodynamic device;

wherein the controller is operative to control the active aerodynamic device to a first position when the geographic location of the vehicle is within the other user-identified region; and wherein the controller is operative to control the active aerodynamic device to a second position when the geographic location of the vehicle is outside of the other user-identified region.

18. The system of claim 16, wherein the body actuator comprises an active suspension system;

wherein the controller is operative to control the active suspension system to a first setting when the geographic location of the vehicle is within the other user-identified region;

wherein the controller is operative to control the active suspension system to a second setting when the geographic location of the vehicle is outside of the other user-identified region.

19. The system of claim 15, further comprising an Advanced Driver Assistance System (ADAS) in communication with the controller;

wherein the geographic map database includes a fourth user-identified region; and wherein the controller is operative to disable the ADAS when the geographic location of the vehicle is within the fourth user-identified region.

20. The system of claim 15, further comprising:

a controllable engine braking device, wherein the controller is operatively connected to the engine braking device;

wherein the geographic map database includes a second predefined region; and wherein the controller is operative to disable the controllable engine braking device when the geographic location of the vehicle is within the second predefined region.

\* \* \* \* \*